United States Patent
Curtis et al.

(10) Patent No.: US 8,472,590 B1
(45) Date of Patent: Jun. 25, 2013

(54) SYSTEMS AND METHODS FOR CONTROLLING THE CONTENT DISPLAYED ON THE BROWSER OF A REMOTE USER

(75) Inventors: Christopher Paul Curtis, North Vancouver (CA); Stuart Clifford McNeill, West Vancouver (CA)

(73) Assignee: Now Solutions Integration Group Inc., Toronto, Ontario (CA)

( * ) Notice: Subject to any disclaimer, the term of this patent is extended or adjusted under 35 U.S.C. 154(b) by 766 days.

(21) Appl. No.: 12/569,690

(22) Filed: Sep. 29, 2009

(51) Int. Cl.
*H04M 1/64* (2006.01)

(52) U.S. Cl.
USPC .............. 379/88.17; 379/202.01; 379/265.01; 709/205

(58) Field of Classification Search
USPC .............. 379/88.17, 202.01, 265.01; 709/205
See application file for complete search history.

(56) References Cited

U.S. PATENT DOCUMENTS

| | | | |
|---|---|---|---|
| 2007/0036330 A1* | 2/2007 | Wagner et al. | 379/265.01 |
| 2008/0059583 A1* | 3/2008 | Mao et al. | 709/205 |
| 2008/0320082 A1 | 12/2008 | Kuhlke et al. | |

OTHER PUBLICATIONS

International Search Report for International Application No. PCT/IB2010/002375 mailed Feb. 24, 2011 (3 pages).
Written Opinion of the International Searching Authority for International Application No. PCT/IB2010/002375 mailed Feb. 24, 2011 (5 pages).

* cited by examiner

*Primary Examiner* — Gerald Gauthier
*Assistant Examiner* — Simon King
(74) *Attorney, Agent, or Firm* — K&L Gates LLP

(57) ABSTRACT

Systems and methods for a first party to control a browser content of a second party. The first party may non-linearly control the second party's browser content via a data network. The installation of software, beyond the installation of the web browser and any applicable software extensions to the browser, is not required by the second party. Simultaneous automated telephonic connections between the first party and the second party also may be established to enhance the system.

18 Claims, 13 Drawing Sheets

SYSTEMS AND METHODS FOR CONTROLLING THE CONTENT DISPLAYED ON THE BROWSER OF A REMOTE USER

BACKGROUND

Generally, JavaScript is a scripting language used to enable programmatic access to objects within both the client application and other applications. JavaScript may be used in the form of client-side JavaScript, implemented as an integrated component of the web browser. A web browser is generally a software application for retrieving, presenting, and traversing information resources on the Internet. Although browsers are primarily intended to access the Internet, they may also be used to access information provided by web servers in private networks or files in file systems. Examples of web browsers are Windows Internet Explorer, Mozilla Firefox, Apple Safari, and Google Chrome. AJAX is generally a group of interrelated web development techniques that may be used on the client-side to create interactive web applications or rich Internet applications, for example. With AJAX, web applications may retrieve data from a server asynchronously in the background without interfering with the display and behavior of the existing page.

SUMMARY OF THE INVENTION

In one general aspect, various embodiments of the present disclosure are directed to a systems and methods wherein a first party can control the browser content of a second party. According to various embodiments, the method may be for communication between a first party and a second party, where the first party has a computer device in a first location and the second party has a computer device in a second location, and where the first party's computer device runs a browser application and the second party's computer device runs a browser application. Furthermore, various embodiments may provide, by the first party's computer device to a processor-based computer server, a first indication of a first content to be displayed by the second party's browser application. Various embodiments may further provide, by the server to the second party's computer device, the first content to be displayed by the second party's browser application after the first indication has been provided to the server, where the server is in communication with the second party's computer device via a data network. Additionally, various embodiments may further provide, by the first party's computer device to a server, a second indication of a second content to be displayed by the second party's browser application after the first indication has been provided to the server. After expiration of a first timer associated with the second party's browser application, a query may be received at the server via the data network from the second party's computer device that queries whether the first content should continue to be displayed by the second party's browser application and in response to the query, the server may provide to the second party's computer device, the second content to be displayed by the second party's browser application at least until the expiration of a second timer.

In another general aspect, a system for communication between a first party and a second party, where the first party has a first computer device in a first location and the second party has a second computer device in a second location, where the first party's computer device runs a browser application and the second party's computer device runs a browser application may comprise a computer database that stores data comprising a first content and a second content and a server in communication with the computer database that electronically communicates with a first computer device and a second computer device, where the server comprises at least one processor circuit and at least one memory circuit, wherein the server is programmed to receive from the first computer device an indication of a first content to be displayed by a browser application run by the second computer device. Further, the server may be programmed to provide to the second computer device the first content to be displayed by the browser application of the second computer device and receive from the first computer device an indication of a second content to be displayed by the browser application of the second computer device. After expiration of a first timer associated with the browser application of the second computer device, the server may receive a query from the second computer device that queries whether the first content should continue to be displayed by the browser application of the second computer device. In response to the query, the server may provide to the second computer device the second content to be displayed by the browser application of the second computer device at least until the expiration of a second timer.

FIGURES

Various embodiments of the present invention are described herein by way of example in conjunction with the following figures wherein.

DETAILED DESCRIPTION OF THE INVENTION

Various non-limiting embodiments of the present disclosure will now be described to provide an overall understanding of the principles of the structure, function, manufacture, and use of the systems, apparatuses, accessories, and methods disclosed herein. One or more examples of these non-limiting embodiments are illustrated in the accompanying drawings. Those of ordinary skill in the art will understand that the systems, apparatuses, accessories, and methods specifically described herein and illustrated in the accompanying drawings are non-limiting example embodiments and that the scope of the various non-limiting embodiments of the present disclosure are defined solely by the claims. The features illustrated or described in connection with one non-limiting embodiment may be combined with the features of other non-limiting embodiments. Such modifications and variations are intended to be included within the scope of the present disclosure.

Embodiments of the present disclosure are described below generally for the purposes of illustration in the context of a call center where an agent controls the browser content of a customer. As discussed in more detail below, the agent may non-linearly display and change content displayed on the customer's browser in order to further and more effectively describe the products or services being offered during the call. It should be recognized, however, that the embodiments are not limited to call center applications. As is to be appreciated, the browser control systems and methods described herein may be implemented in a variety of applications and environments, such as on-line sales, on-line presentations, lecturing environments, educational environments, etc. It is intended that all such implementations are within the scope of this disclosure and the appended claims.

In addition, in the context of a call center, embodiments are described below for purposes of illustration as having an associated, simultaneous, or coincident telephone call between the call center agent and the customer. As is also to be appreciated, the present disclosure is not limited to embodiments utilizing a simultaneous telephony-based connection between the parties engaged with the presentation. In some applications, there may be no associated voice component, and in other embodiments the voice component may be provided in ways other than telephone calls, such as radio broadcasts, podcasts, etc.

Figure 1:
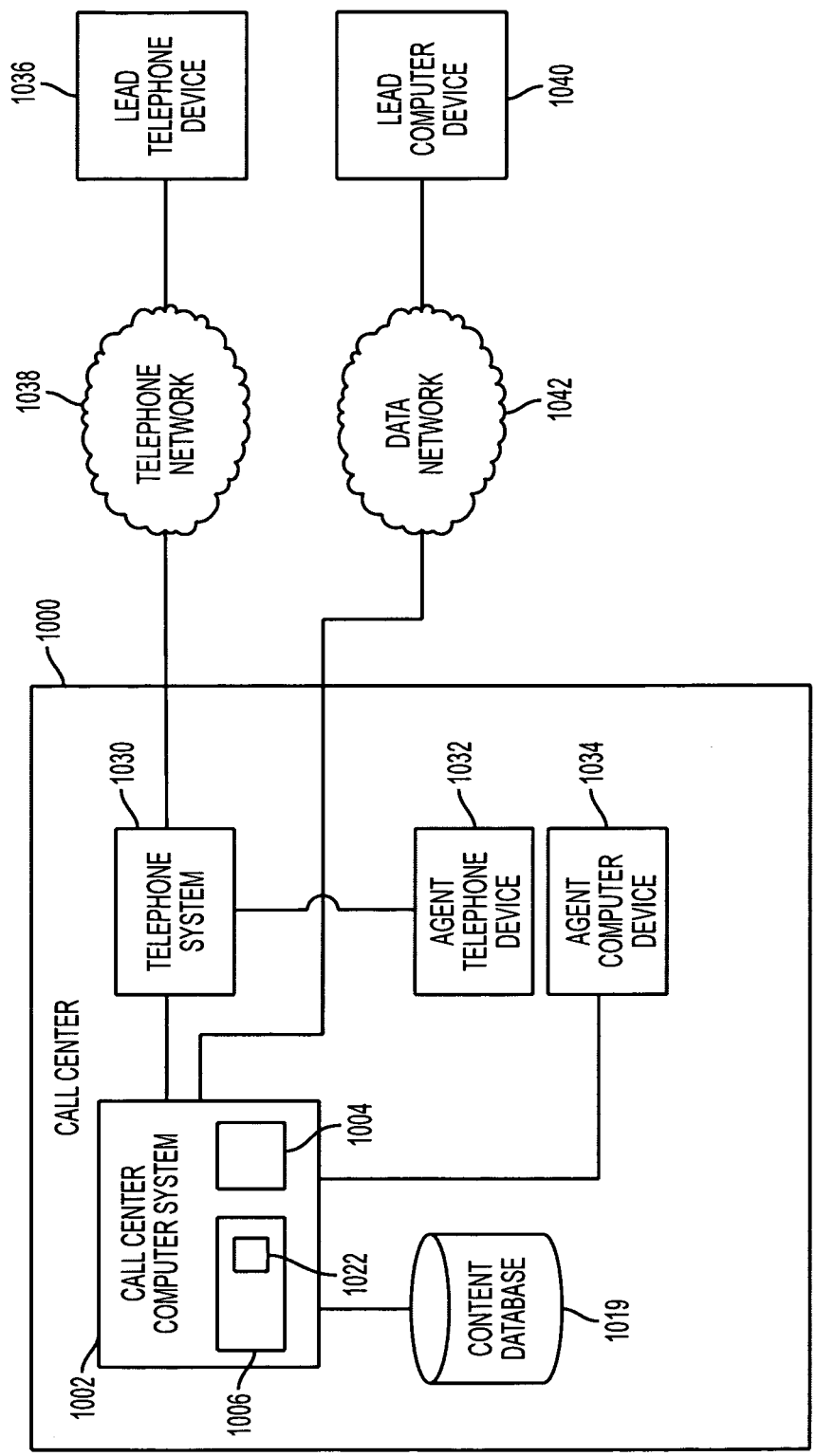
FIG. 1 is a schematic illustration of a call center according to one non-limiting embodiment.

FIG. 1 is a schematic illustration of a call center according to one non-limiting embodiment. A call center 1000 may comprise a call center computer system 1002. The call center computer system 1002 may comprise one or more processor 1004 and a memory 1006 configured to store a set of instructions 1022. The processor 1004 may comprise a processor integrated circuit, for example, having one or multiple cores. The memory 1006 may comprise various forms of memory circuits, such as volatile and non-volatile memory, for example. The volatile memory may comprise RAM, such as a RAM IC. The non-volatile memory may comprise ROM (such as a ROM IC), PROM (such as an EEPROM IC), a magnetic hard disk drive, and/or an optical disk drive, for example. The call center computer system 1002 may use data stored in a content database 1019. The content database 1019 may store content that may be provided to a customer's browser during a presentation, as discussed in more detail below. The content database 1019 may be memory (e.g., ROM) and/or mass storage systems of the computer system (s) of the call center 1000. The call center computer system 1002 may have one or multiple processors and/or that the processors may have one or multiple cores. The call center 1000 may further comprise a telephone system 1030 such as ASTERISK® PBX, for example. An agent, telephone device 1032 may be in communication with the telephone system 1030 and an agent computer device 1034 may be in communication with the call center computer system 1002. As is to be appreciated, the call center 1000 may comprise a variety of other devices, networks, and paths of communication.

The call center 1000 may comprise a plurality of human agents, with each agent be positioned at a station comprising the tools and equipment necessary to perform their job duties, such as the agent telephone device 1032 and the agent computer device 1034. It is to be appreciated that the call center 1000 may comprise any number of agents, such one to one thousand, or more, for example. Furthermore, individual agents or groups of a agents may be located in remote locations and still be associated with the call center 1000. For example, in some embodiments, the call center 1000 may be a collection of agents that are each working from their home or a collection of satellite offices. The agents may have a network connection to the call center 1000 in such cases.

Still referring to FIG. 1, the call center 1000, during a presentation between an agent and a customer, may be in communication with a customer telephone device 1036 via a telephone network 1038. Furthermore, the call center 1000 may be in communication with a customer computer device 1040 via a data network 1042, such as the Internet, for example. As is to be appreciated, the telephone network 1038 and the data network 1042 may either be the same or different networks. Also, the customer telephone device 1036 and the customer computer device 1040 may be combined into a single device, such as a web-enabled telephone, for example.

A customer and an agent may come in contact through various channels. In one embodiment, a customer may visit a webpage and indicate that the customer wishes to converse with an agent about a particular service or product. The customer may then populate an on-line form with information, such as name and telephone number, and electronically transmit the form to the call center. The form may have a 'call me now option' preselected. The form may also include a calendaring functionality allowing the customer to schedule a call at a future date. Upon successful transmission of the form, the customer may be provided with an access code from the call center. The access code may be provided to the customer using any suitable technique, such as by displaying the access code on a webpage, sending the code via e-mail, or sending the code via a text message, for example. For outgoing calls to the customer, an automated telephone system associated with the call center, may then dial the telephone number for the customer provided in the form. Upon answering the telephone, the customer may be asked to input the access code in order to verify the identify of the customer and reduce spurious connections. Once the customer has been verified, the telephone system of the call center may connect the selected agent to the call with the customer. As is to be appreciated, any suitable telephony network may be used, such as traditional telephone networks (e.g., public switched telephone network) or VOiP networks, for example. Additionally, the call center's telephone system may be implemented using any suitable telephony engine, such as ASTERISK® PBX, for example.

Figure 2:
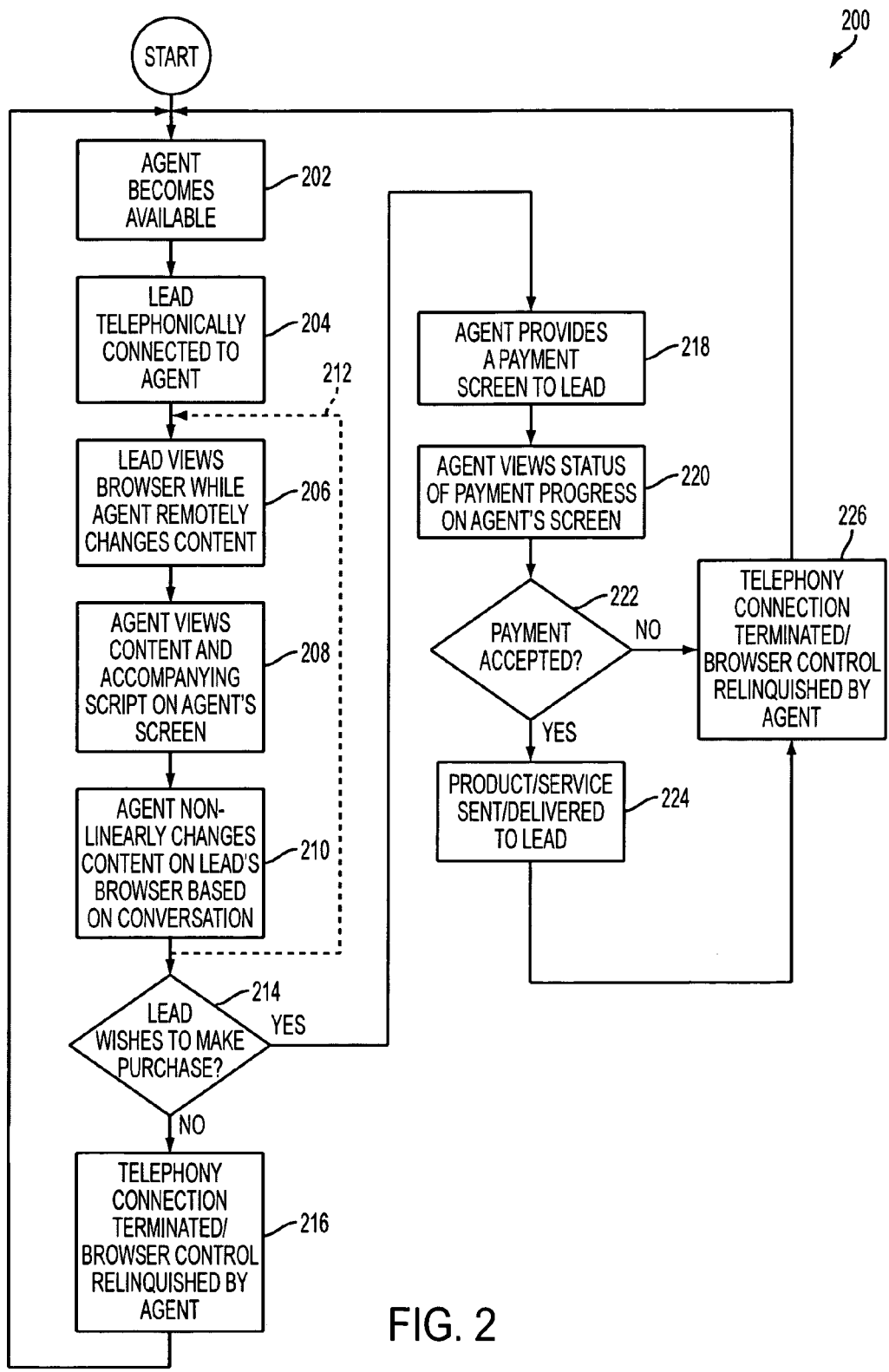
FIG. 2 is a flow chart of an agent-customer interaction according to one non-limiting embodiment.

FIG. 2 is a flow chart 200 of an agent-customer interaction according to one non-limiting embodiment. At 202, the agent becomes available to communicate with a customer. The agent may, for example, login to a call center computer system to indicate their availability. Alternatively, the call center management software may monitor the status of the individual agents and be aware that the agent is not currently engaged with a customer. At 204, the customer is telephonically connected to the agent through any suitable method, such as a private branch exchange. At 206, the customer views their browser on a computer device while the agent remotely changes the content through interaction with the agent's computer device. At 208, the agent may view the content that is displayed to the customer and view an associated script on the agent's screen associated with the agent's computer device. At 210, the agent non-linearly changes the content on the customer's browser based on the conversation between the customer and the agent. For example, the agent may select one of a plurality of screens from a menu displayed on the agent's screen. As represented by return path 212, as the conversation between the customer and agent progresses, the agent may continue to change the content on the customer's screen.

Still referring to FIG. 2, at 214, it may be determined if the customer wishes to make a purchase. In other embodiments, other "goals" may be desired besides making a purchase, such as scheduling a follow-up meeting or adding the customer to a mailing list, for example. If the customer declines, the agent may show the customer a different offer or add the customer's telephone number to a do-not-call list. If the customer needs more time to make a purchasing decision, the agent may schedule a follow-up call with that agent or request a general request for a callback. Ultimately, the telephony connection may be terminated and the agent's control of the customer's browser may be relinquished at 216. If the customer wishes to make a purchase, or otherwise needs to provide information, a payment screen (or other goal screen) is provided to the customer at 218. While the payment screen is provided to the customer, the agent views the status of the payment progress on the agent's screen at 220. At 222, it is determined if the payment is accepted. If the payment is accepted, at 224 the product or service may be sent or delivered to the customer. In some embodiments, if the payment process has errors, the agent may assist the customer to correct the errors. If payment is ultimately not accepted, at 226 the telephony connection may be terminated and the agent's control of the customer's browser may be relinquished.

As is to be appreciated, the process of delivering, providing, or sending the product or service, illustrated at 224, may differ based on different applications. For example, in one implementation, insurance coverage may be secured for the customer while in other implementations a product may be sold, leased, or otherwise conveyed to the customer. The embodiments presented herein are not limited to any particular service, product, or offering, but instead may be implemented across a number of varying applications, such as business services, consumer services, technical support services, travel services, and customer service support services, for example.

Furthermore, in various embodiments, the goal of the interaction between the agent and the customer may not necessarily to make a "purchase" during the conversation. For example, in one embodiment, a goal of the interaction between the agent and the customer may be to schedule a follow-up meeting with a representative. Accordingly, a screen showing a calendar may be presented to the customer and the customer could select an appointment time. Meanwhile, as the calendar is displayed to the customer, the agent may be receiving status updates with regard to the customer's progress. In another embodiment, a goal of the interaction between the agent and the customer may be to sign the customer up for a mailing list. Accordingly, a screen prompting the customer for a mailing address or email address, for example, may be presented to the customer and the customer could complete a form with personal information. Meanwhile, as the form is displayed to the customer, the agent could be receiving status updates with regard to the customer's progress. Thus, various "goal" screen, such as payment screens, calendar screens, personal information screens, for example, may be provided to the customer in various embodiments.

Figure 3:
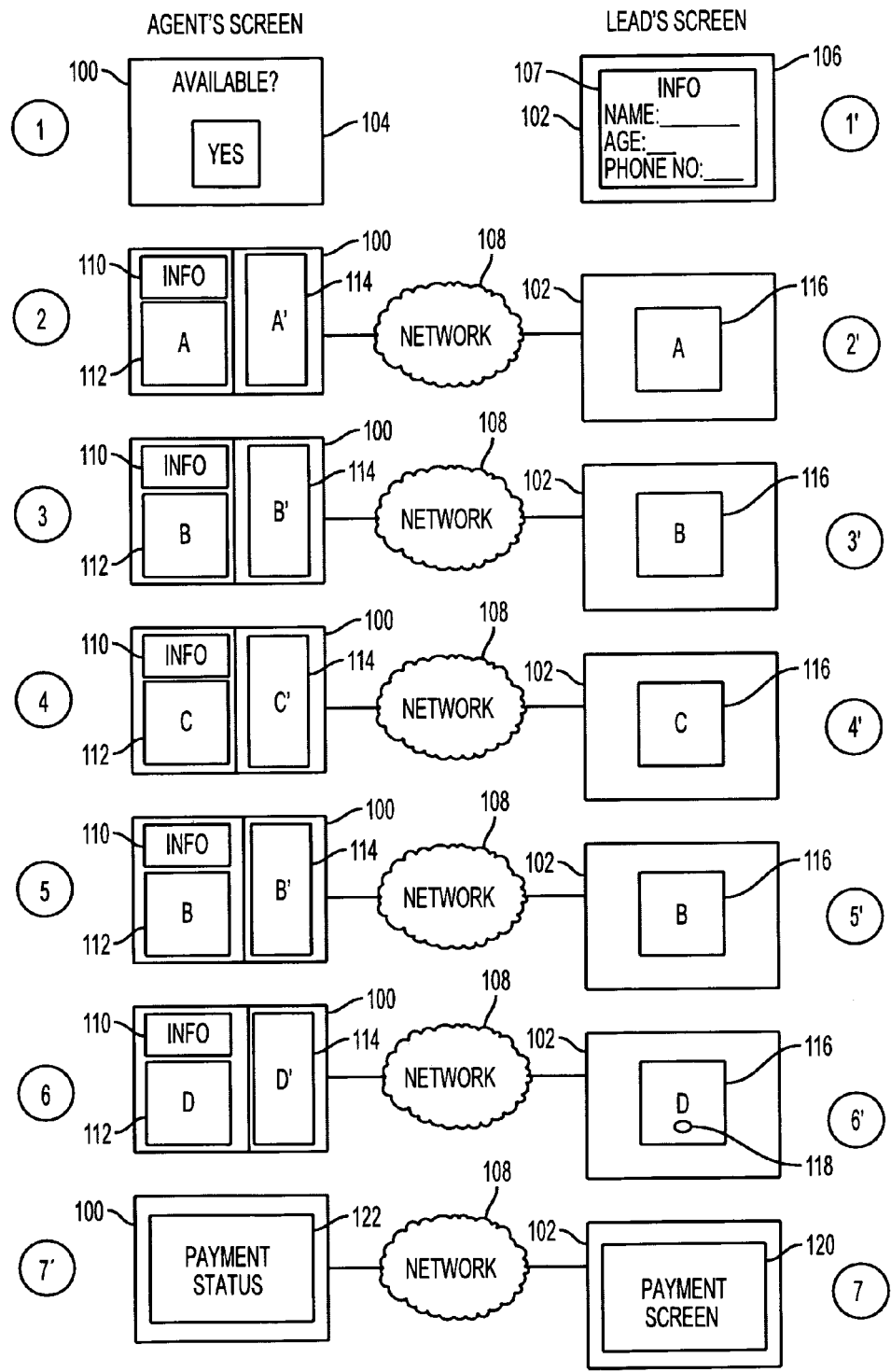
FIG. 3 is a time-based illustration of an example interaction between an agent and a customer in accordance with one non-limiting embodiment.

FIG. 3 is a time-based illustration of an example interaction between an agent and a customer. The passing of time is illustrated by time points 1-7'. FIG. 3 illustrates the agent's screen 100 and the customer's screen 102 at different points in time throughout the interaction. The agent's screen may be located in a call center or at the agent's home, for example. The customer's screen may be provided by the customer's personal computer, mobile device, or any other device or system capable of receiving and displaying data via an electronic network. Additionally, it is to be appreciated that the embodiments disclosed herein are not limited to agent's and customers, but include any suitable first party communicating with a second party. At time point 1 the agent's screen may display a log-in screen 104. Using the log-in screen 104, the agent may inform the call center's computer system that the agent is available to communicate with customers. Thus, at any given time point, the call center's computer system is aware of all agents that are logged in to the call center. At time period 1', a customer may encounter an information screen 106 comprising or linked to a form 107. For example, the customer may desire to learn more about a product, service, or opportunity described on a website. The form 107 may request information regarding the customer, such as age and telephone number. As is to be appreciated, the information screen 106 may be hosted on any suitable network, such as the Internet. Furthermore, the information screen 106 may be displayed on any suitable web browser, such as Windows Internet Explorer, Mozilla Firefox, Apple Safari, or Google Chrome, for example. Thus, installation of software, beyond the installation of the web browser and any applicable software extensions to the browser (e.g., plug-ins), is not required by the customer. By completing the online form 107, the customer data may be transmitted via the Internet (or other data communication network) to the call center 10. When the form is submitted by the customer, a screen may be displayed on the customer's browser containing an access code. In some embodiments, the access code is provided to the customer by other techniques, such as e-mail, or a text message, for example.

The information from the form 107 may be parsed and analyzed by the call center's computer system. In various embodiments, the call center may place a call to the customer. Upon answering, the customer will be requested to enter their access code via the customer's telephone device. In various embodiments, while the customer is answering the call and entering the access code, the call center computer system may route the call center's end of the call to an available agent. A telephony-based connection may then be established between the customer and the agent using any suitable technique. The call center may monitor the availability of the agents based on their login status as described above.

Once the call is connected between the agent and the customer, the agent's computer may connect to the customer's browser via a data network 108, as described in more detail below. At time point 2, the agent may view on their screen(s) a variety of information, such as a customer information block 110, a content block 112, and a script block 114. As is to be appreciated, the content of the agent's screen may differ for varying applications. The customer information block 110 may contain information regarding the customer with whom the agent is connected, such as name and address. The information displayed in the customer information block 110 may be gleaned from an online form the agent completed, and/or data gathered from other data mining sources, for example. In some embodiments, the agent may further populate the information block 110 with newly acquired information. In other embodiments, the newly gathered information about the customer may be entered in other formats, such as in a "notes" portion of the agent's screen. The content block 112 may be web-based content "A" describing a service or a product, for example. The script block 114 may be a script that that is associated with the content in the content block 112. Once the association is made between the agent's computer and the customer's computer via the network 108, and after the content has been transmitted to the customer's screen from the agent's computer, the customer may view agent-specified content 116 on their screen. The agent-specified content 116 may be substantially similar to the content block 112. The agent-specified content 116 may be displayed as a web-page or part of a web-page. The agent-specified content 116 may include text, hyperlinks, forms, a portable document format (PDF) file, graphics, multi-media content, video, audio, Flash, XML, or any other types of content that may be delivered to the customer's screen via the network 108.

Based on the conversation between the agent and the customer, the agent can decide to change the agent-specified 116 content being displayed to the customer. The agent-specified 116 content on the screen may be changed by the agent for new content, or the existing page can be appended with extra information. In some embodiments, the agent may have access to a wide variety of content that can be served to the customer throughout the session. The particular order of the content is not necessarily established before the call, as the agent may have the flexibility to pick and choose the content to serve to the customer based on the ongoing conversation between the agent and the customer. At time point 3, the agent may decide to change the display of the customer's screen. As illustrated, the content in the content block 112 is changed to "B" content and the script block 114 is changed to include other information about the "B" content. Once the customer's browser determines that new information should be displayed (discussed in more detail below), the "B" content is displayed on the customer's screen 102 as agent-specified content 116 at time point 3'. As illustrated by time points 4-6', the agent may display a variety of content on the customer's screen 102, such as "C" content, "B" content, and "D" content. The order of the content delivery and the duration of time spent displaying the various content may be variable and determined by the agent, for example.

The "D" content displayed in the agent-specified content 116 on the customer's screen 102 may contain a payment link 118. The payment link 118 may be a hyperlink that the customer can selectively activate using an input device, such as a mouse or a touch screen interface. Once the payment link 118 has been activated, an online payment screen 120 may be displayed on the customer's screen 102. The online payment screen 120 may be a form in which the customer enters credit card information, banking account information, or other types of personal or secured payment information. While the online payment screen 120 is displayed on the customer's screen 102, a payment status screen 122 may be displayed on the agent's screen 100. The agent cannot view the actual payment information being supplied by the customer; instead, the agent is provided with an ongoing status of the payment process. For example, the payment status screen 122 may display a status indicator providing that a credit card number has been accepted or a credit card number has been rejected, for example, without showing the credit card information to the agent. Since the customer and agent are telephonically connected, the agent may verbally assist the customer through the payment process if necessary. As is to be appreciated, however, the present disclosure is not limited to embodiments utilizing a telephony-based connection. For instance, the computer devices of the parties involved in the presentation may be associated through a server connection, but the parties may not be concurrently telephonically connected. Also, other type of coincident communication may be used, such as radio broadcasts, podcasts, etc.

Figure 4:
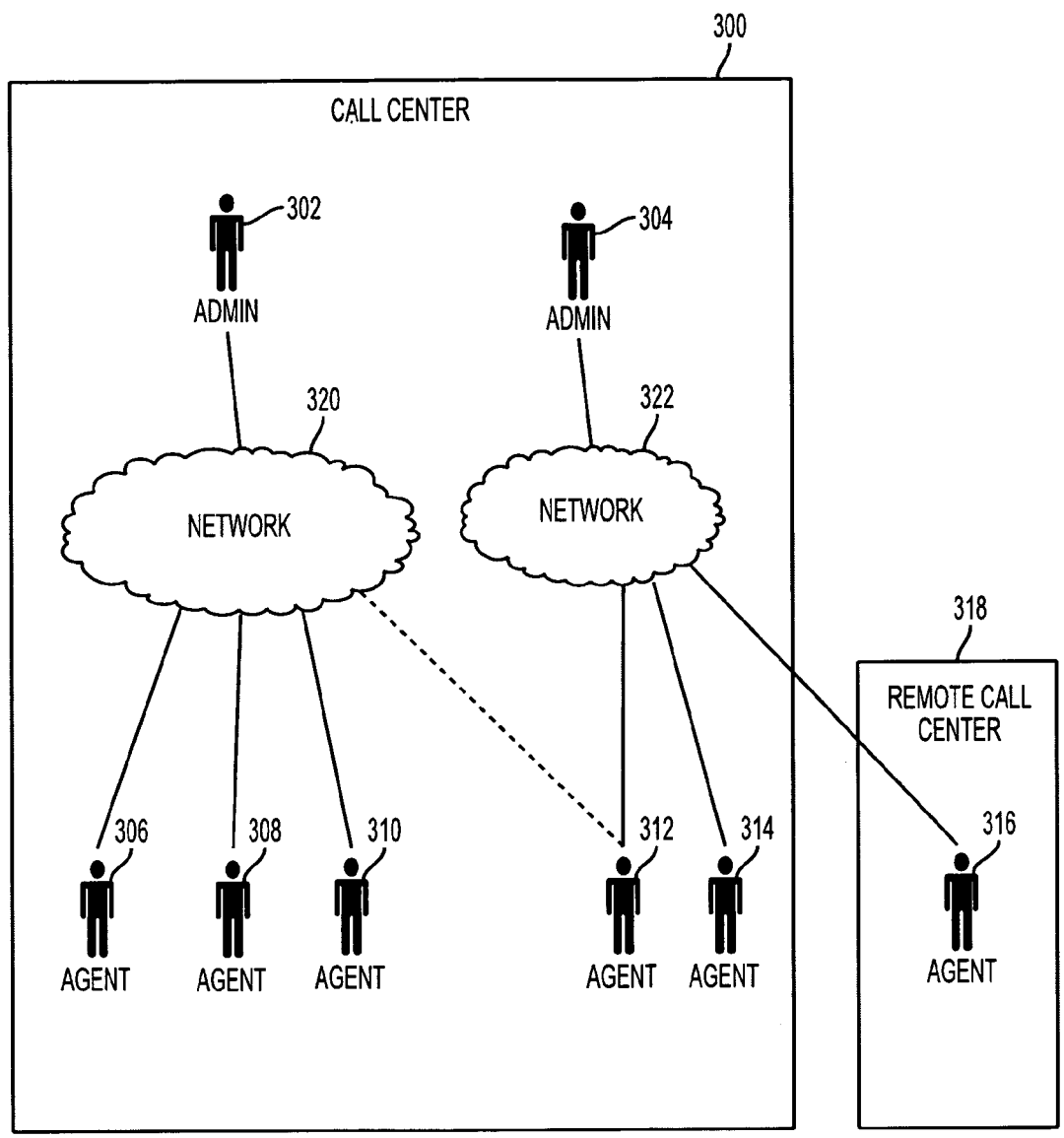
FIG. 4 is an illustration of an administrative hierarchy of a call center in accordance with one non-limiting embodiment.

FIG. 4 is an illustration of an administrative hierarchy for a call center in accordance with one non-limiting embodiment. The call center 300 may be staffed with a plurality of administrators 302, 304 and a plurality of agents 306, 308, 310, 312, 314, 316. It is to be appreciated that various call centers may be staffed with varying levels of management structure and varying numbers of agents and administrators. Accordingly, the embodiments described herein are not limited to any particular call center configuration. Any number of agents or administrators may be physically located in a remote location from other agents or the administrators. As illustrated, agent 316 is shown located in a remote call center 318.

The administrators may be connected to the agents through data network connections, such as a WAN, LAN, or other type of network. Administrator 302, for example, is connected to agents 306, 308, 310 via network 320 while administrator 304 is connected to agents 312, 314, 316 via network 322. As illustrated, an agent may be associated with any number of administrators, with agent 312 networked to both administrator 302 and administrator 304. The administrators 302, 304 may be able to view various statistics and information regarding the agents. For example, using charts, graphs, and data displayed on their computer screens, an administrator may be able to view an agent's average time per call, average time per content screen, idle time, and comparisons of agents' statistics. Additionally, the administrator may be able to perform "real time" monitoring of the various agents and view an overview of the status of an individual agent or a group of agents. For example, an administrator may be able to see that agent 306 is "logged out" while agent 316 is logged in, presently on a call on page 2 of a presentation. An administrator may also be able to view the agent's screen and/or listen in to the telephone call with the customer. The administrator may also have access to various menus and systems for scheduling agents and to directly communicate with the agents' computer devices, such as by instant messaging.

Figure 5:
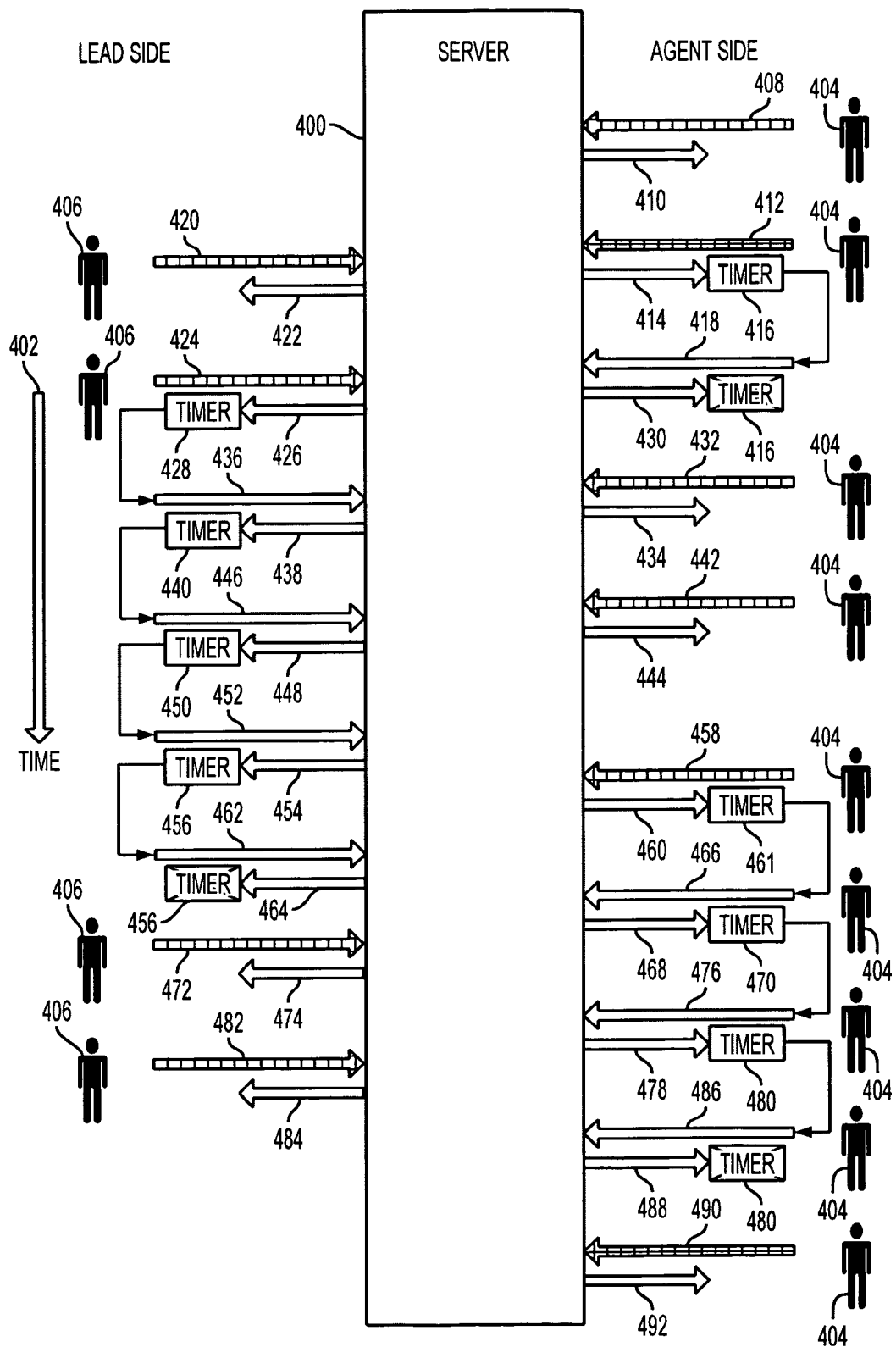
FIG. 5 is a time-base illustration of agent-side and customer-side interactions with a call center server in accordance with one non-limiting embodiment.

FIG. 5 is a time-base illustration of agent-side and customer-side interactions with a call center computer-based server 400 in accordance with one non-limiting embodiment. The passage of time is indicated by arrow 402. For simplicity, the server 400 is illustrated as a single element (e.g., a single computer-based server) in FIG. 5. As is to be appreciated, however, the server 400 may comprise a collection of various networked computer systems and devices, such as routers, servers, switches, and hubs, distributed across multiple geographic areas. An agent 404 and a customer 406 interact with the server 400 through their respective computer devices, such as a personal computer, a laptop computer, or a web-enabled mobile device, for example. At 408, the agent 404 requests a login form from the server 400. At 410, a login form is served to the agent 404 by the server 400. At 412, the agent 404 submits login data, such as a username and password, to the server 400 via the login form. At 414, a response is delivered to the agent's 404 browser from the server 400 indicating the agent 404 is logged in and waiting for a connection with a customer. After the expiration of a timer 416, at 418, an automated request is sent to server 400 via a network from the agent's browser to determine if a customer call is waiting for the agent 404. The automated request in various embodiments may use AJAX or other asynchronous web-based communication modes. Additionally, in various embodiments, the website content agent's 404 browser may be load with various placeholders for AJAX content. In one embodiment, the placeholders are DIV tags, including 'watch,' 'available_buttons,' and 'online_status.' If, for example, it is determined by the server that there are not any outstanding calls for the agent, the DIV 'online_status' goes green. Meanwhile, at 420, the customer 406 submits a form request to the server 400 via a network, using the customer's browser on the customer's computer, for example. At 422, the requested form is served to the customer 406 by the server 400 via the network. At 424, the customer submits a completed form to the server 400 via the network, and at 426 a wait page is displayed to the customer on the customer's browser. The wait page may include an alphanumeric access code. After the wait page is presented to the customer, a timer 428 is initiated. At 430, customer information, culled from the customer's form, is presented by the server 400 to the agent and the timer 416 is terminated. Additionally, in various embodiments, the DIV 'available_buttons' maybe loaded with various buttons so that agent 404 may graphically select a button to display associated content. At 432, the agent 404 submits data to server 400 instructing the server 400 to show particular content (P1 content) to the customer 406. In response to receiving the data, the server 400 provides the agent 404 with a script associated with the P1 content at 434 by displaying the script on the agent's browser. On the customer-side, at 436, after the expiring of the timer 428, an automated request is sent to server 400 from the customer's computer to determine if the wait screen should continue to be displayed. Since the agent 404 submitted the instruction to display P1 content, in the example of FIG. 5, at 438 the server 400 responds to request 436 by displaying P1 content on the customer's 406 browser. Once the P1 content is displayed, a timer 438 is initiated. The P1 content is displayed on the customer's browser at least until the expiration of the timer 438. As is to be appreciated, the various timers utilized by the system may be set to any suitable time periods, such as 5 milliseconds, for example. Furthermore, the timers may be implemented using any suitable technique, such as with a javascript timer. At 442, the agent 404 submits data to server 400 via the network instructing the server 400 to show different content (P2 content) to the customer 406. In response to receiving the data, the server 400 provides the agent 404 with a script associated with the P2 content at 444.

On the customer-side, at 446, after the expiring of the timer 440, an automated request is sent to server 400 via the network to determine if P1 should continue to be displayed. Since the agent 404 submitted the instruction to display P2 content, at 448 the server 400 responds to request 446 by displaying P2 content on the customer's 406 browser. Once the P2 content is displayed on the customer's browser, a timer 450 is initiated. At 452, after the expiring of the timer 450, an automated request is sent to server 400 to determine if P2 should continue to be displayed by the customer's browser. Since the agent 404 has not submitted the instruction to display different content, at 454 the server 400 responds to request 452 by indicating there is no change to the P2 content and a timer 456 is initiated.

On the agent-side, at 458, the agent 404 submits data to server 400 via the network instructing the server 400 to show a payment page to the customer 406. In response to receiving the data, the server 400 provides the agent 404 with a payment status page at 460 via the network and a timer 461 is initiated. The payment status page may provide the current status of the payment transaction without divulging secure or private information to the agent 404. At 462, after the expiring of the timer 456, an automated request is sent to server 400 via the network to determine if P2 should continue to be displayed. Since the agent 404 has submitted the instruction to display the payment page, at 464 the server 400 responds to request 462 by serving the payment page to the customer 406 and the timer 456 is terminated.

On the agent-side, at 466, after the expiring of the timer 461, an automated request is sent from the agent's browser to the server 400 to determine if payment has been submitted by the customer 406. At 468, the status of the payment process is returned to the agent's browser via the network and a timer 470 is initiated. On the client-side, at 472, the customer 406 submits credit card information to the server 400 by entering the numbers into the customer's browser. At 474, the server 400 informs the customer 406 that a payment error has occurred and continues to display the payment screen. As is to be appreciated, the server 400 may indicate the error that was detected, such as an invalid credit card number or an incomplete address.

On the agent-side, at 476, after the expiring of time 470, an automated request is sent to server 400 via the network from the agent's browser to determine if payment has been submitted by the customer 406. At 478, the error status of the payment process is returned to the agent's browser via the network and a timer 480 is initiated. On the client-side, at 482, the customer 406 successfully submits credit card information to the server 400 via the network. At 484, the server 400 informs the customer 406 via the network that the payment has been successfully transmitted.

On the agent-side, at 486, after the expiring of time 480, an automated request is sent to server 400 to determine if payment has been submitted by the customer 406. At 488, the status of the successful payment process is returned to the agent's browser and a timer 480 is terminated. At 490, the agent 404 instructs the server 400 to close the presentation and finish the call. At 492, a response is delivered to the agent's 404 browser indicating the agent 404 is logged in and waiting for a connection with a customer.

In various embodiments, should an agent lose a browser session before the completion of a call, by re-logging into the server 400 the agent may automatically be reconnected to the correct customer and at the same point in the presentation. Similarly, should a customer lose their browser session, by visiting a specified URL they may be reconnected to the original agent at the same point in the presentation. Furthermore, when the telephonic connection between the agent and customer is prematurely terminated, the agent and customer may be reconnected telephonically through the telephony system. For example, the telephony system may re-dial the telephone number provided by the customer on the previously completed form.

The server 400 may include software instructions and software modules built using any suitable programming methods and techniques. In one embodiment, Apache 2.x is utilized for web server functionality. Perl, or any other general-purpose programming language, may be used to build various functions of the server 400. Additionally, various database management systems (DBMS), such as a relational database system employed SQL as the query language, may be utilized by the system. Furthermore, javascript, PHP, or other scripting languages, may be used in the creation of the customer-side dynamic web pages.

Figure 6:
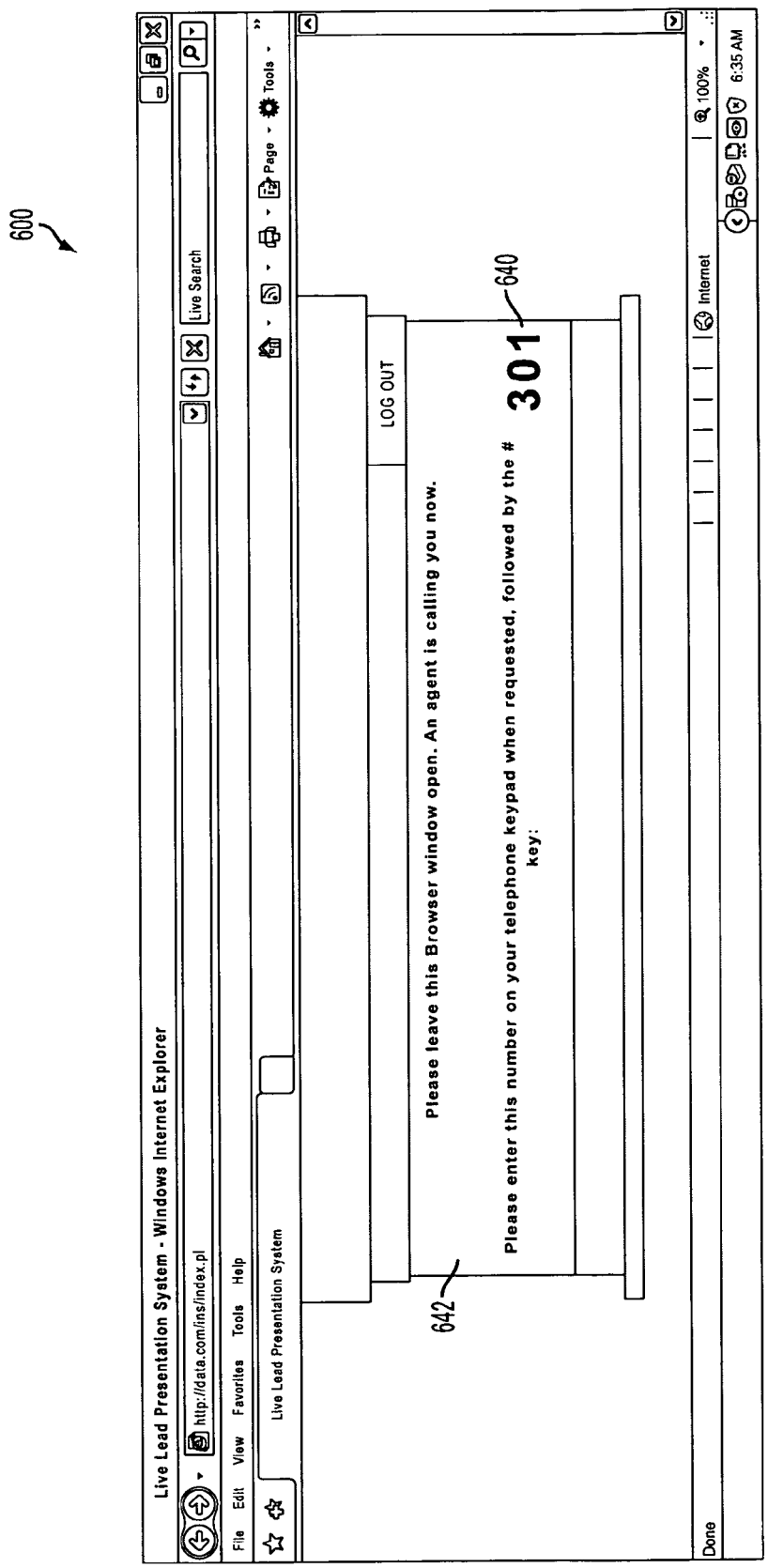
FIG. 6 through FIG. 12 are screen shots in accordance with various non-limiting embodiments.

FIG. 6 through FIG. 12 are screen shots in accordance with various embodiments. FIG. 6 is an illustration of a customer's screen 600 after the customer has submitted an HTML form. The screen 600 may comprise, for example, an access code 640 and instructions 642.

Figure 7:
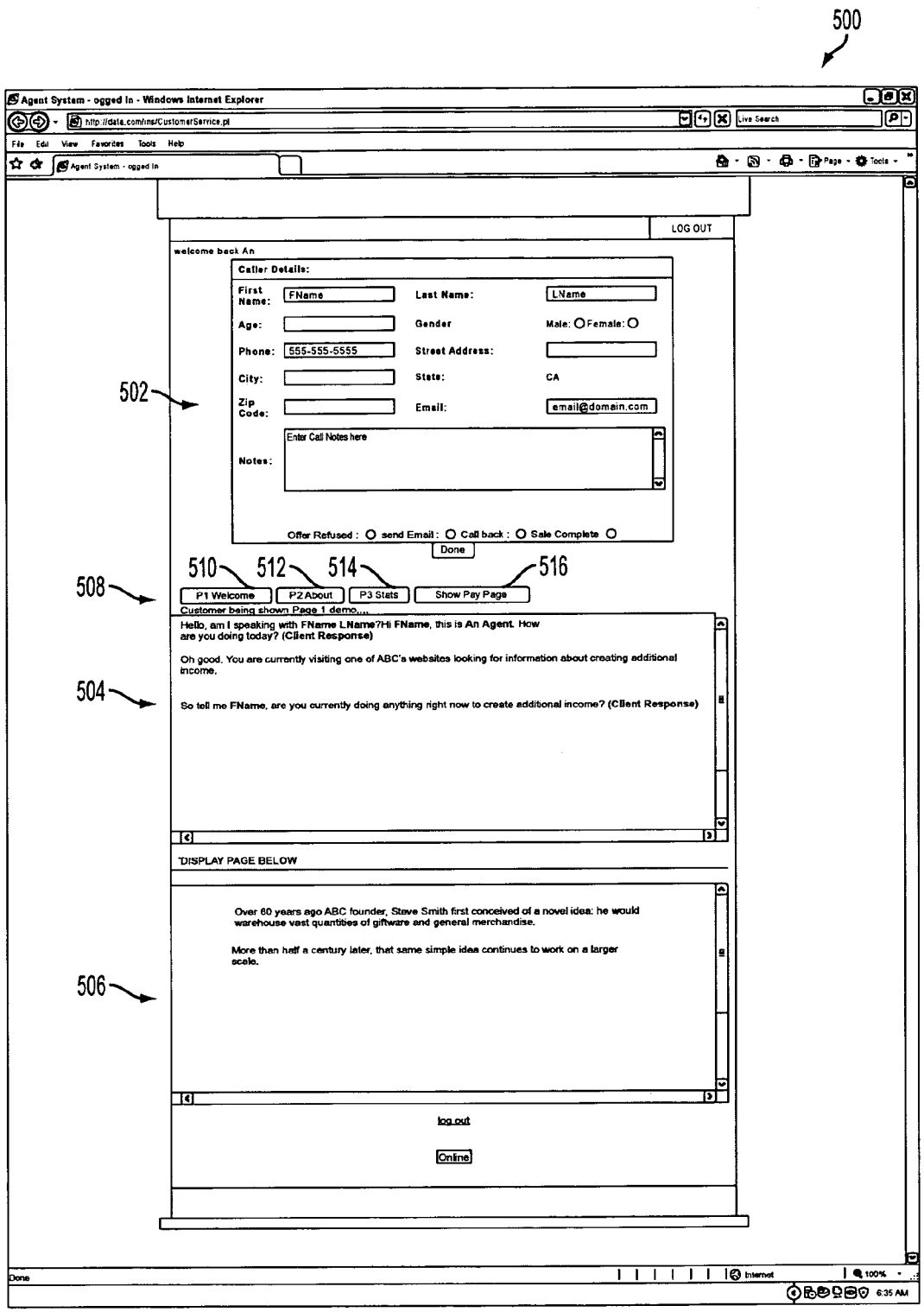

FIG. 7 is a view of an agent's screen 500 during a call with a customer according to one embodiment. The screen 500 may comprise three general sections, an information section 502, a script section 504, and a content section 506. The information section 502 may contain information about the customer and may include information the customer previously typed into a form or information about the customer that was gathered through other methods, such as third party services. The information section 502 may remain relatively stagnant throughout the call, thereby continually providing the agent with information about the customer. The script section 504 may contain information that can be verbally relayed to the customer via telephone. The content section 506 may include the information that is concurrently displayed on the customer's browser. The screen 500 may also include other features, such as a content selection menu 508. The content selection menu 508 may provide the agent with the ability to choose between the various content available for transmission to the customer. In the illustrated embodiment, the content selection menu 508 comprises a P1 button 510, a P2 button 512, a P3 button 514, and a payment page button 516. The agent may select any button at any time to change the content of the content section 506, thereby changing the content in the script section 504 and the content on the customer's browser.

Figure 8:
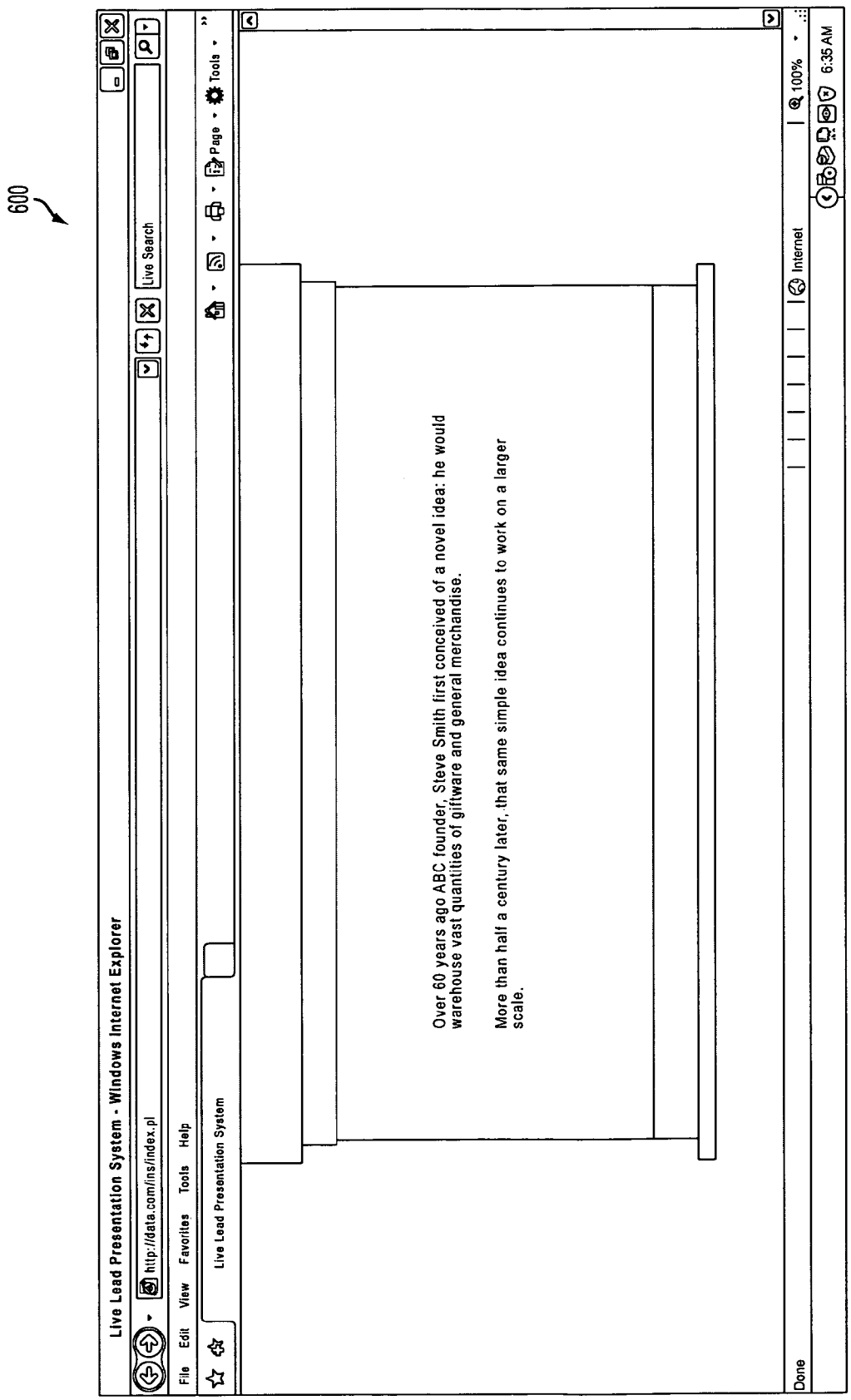

FIG. 8 illustrates a corresponding the customer's screen 600 during the call. The customer's screen may have a content section 602. As previously described, the information displayed in the content section 602 may be altered by the agent remotely. As illustrated, the content displayed in the content section 602 is similar to the content in content section 506 (FIG. 7) on the customer's screen 500.

Figure 9:
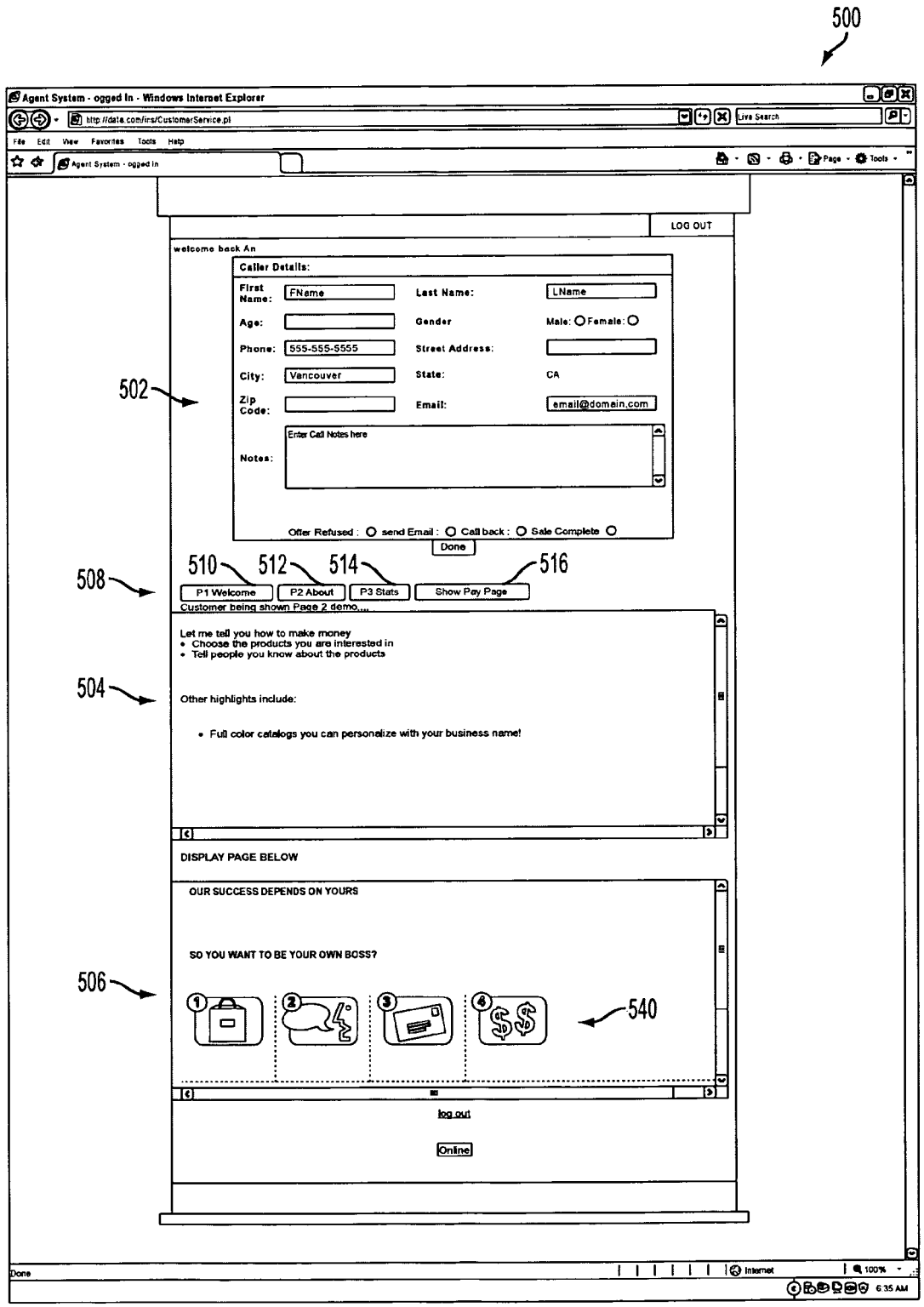
Figure 10:
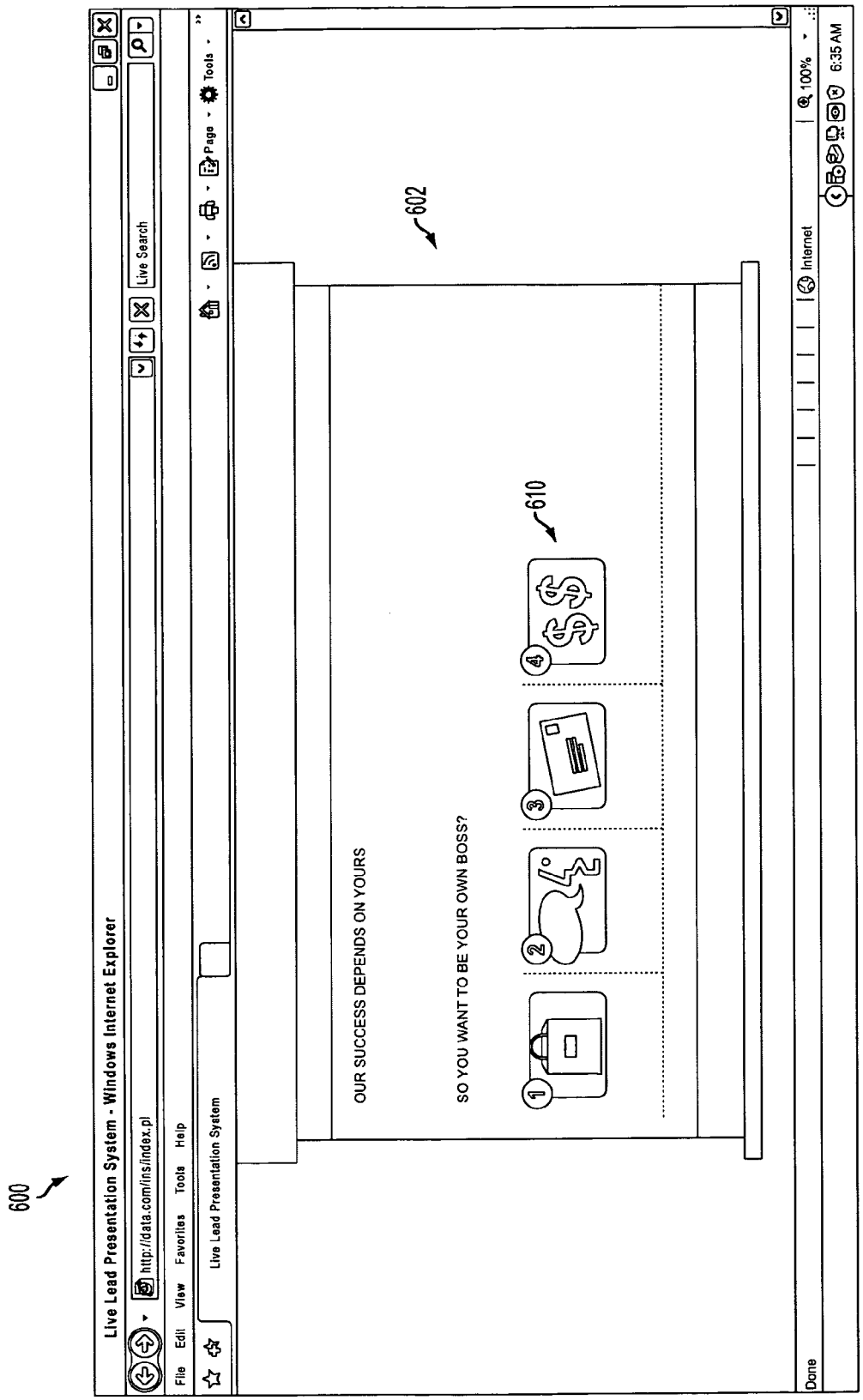

FIG. 9 is a view of an agent's screen 500 during a call with a customer according to one embodiment. As illustrated, the content of the script section 504 and the content section 506 has been changed by the agent. The content section 506 contains graphics 540. FIG. 10 illustrates the corresponding customer's screen 600. As illustrated, the content section 602 is displaying graphics 610 that are similar to graphics 540. As previously described, the information displayed in the content section 602 may be altered by the agent remotely. As illustrated, the content displayed in the content section 602 is similar to the content in content section 506 (FIG. 9) on the customer's screen 500.

Figure 11:
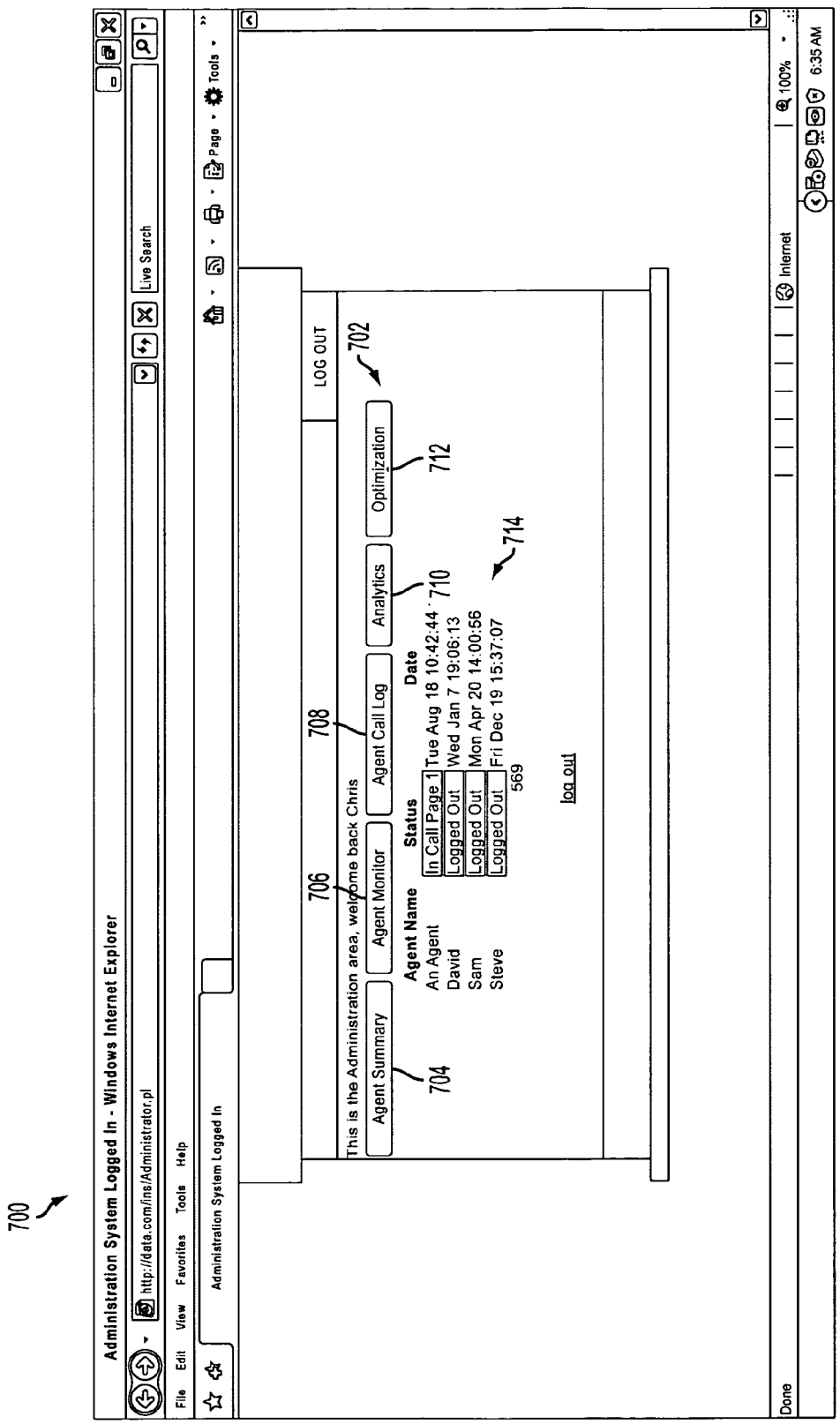

FIG. 11 is a view of an administrator's screen 700 in accordance with one non-limiting embodiment. The screen 700 may comprise an administrator menu 702 allowing the administrator to select various options, such as an agent summary option 704, an agent monitor option 706, an agent call log 708, analytics options 710, and optimization options 712. As illustrated, the screen 700 may have an agent status overview portion 714. The agent status overview portion 714 may provide the administrator with real-time, or near real-time, information regarding the various agents associated with the call center.

Figure 12A:
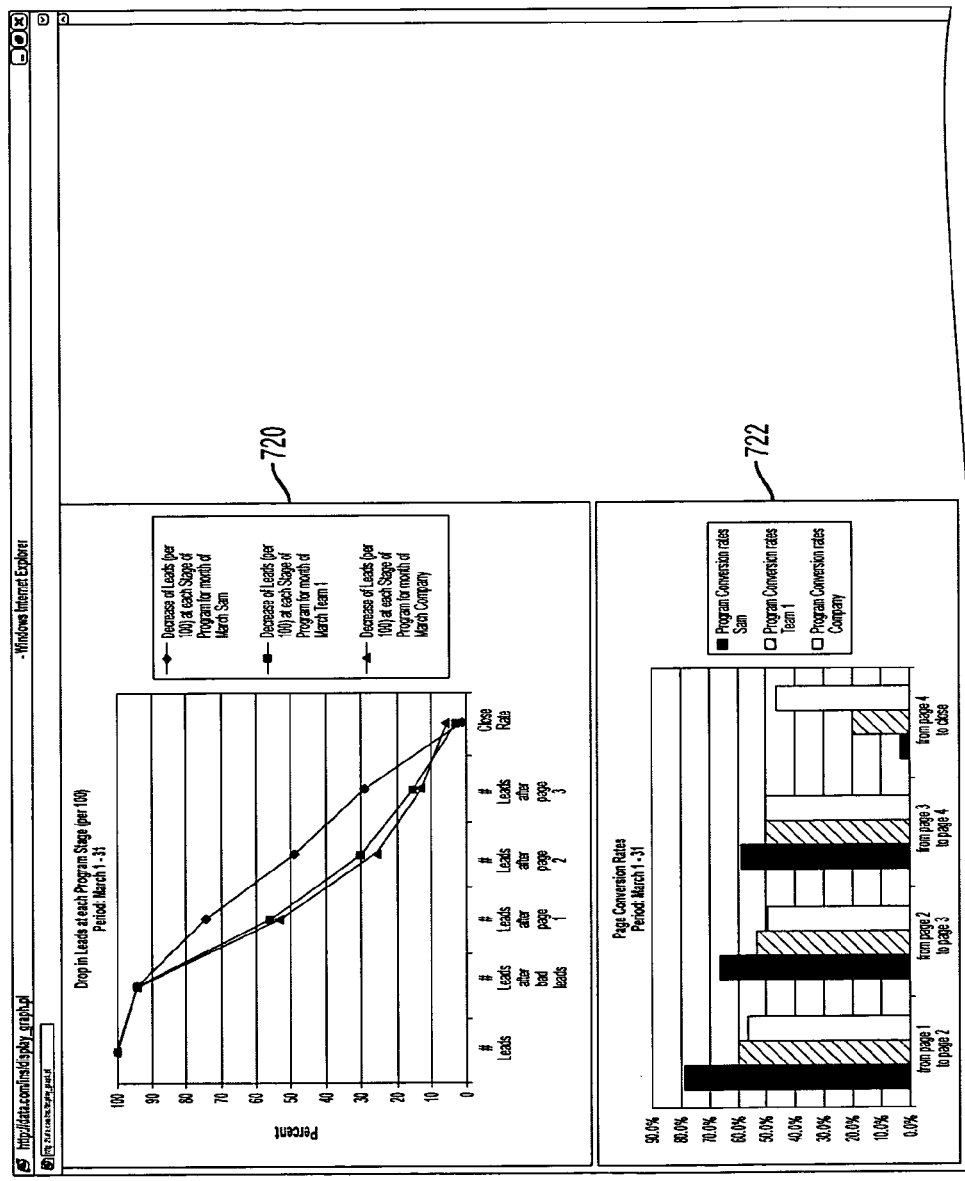
Figure 12B:
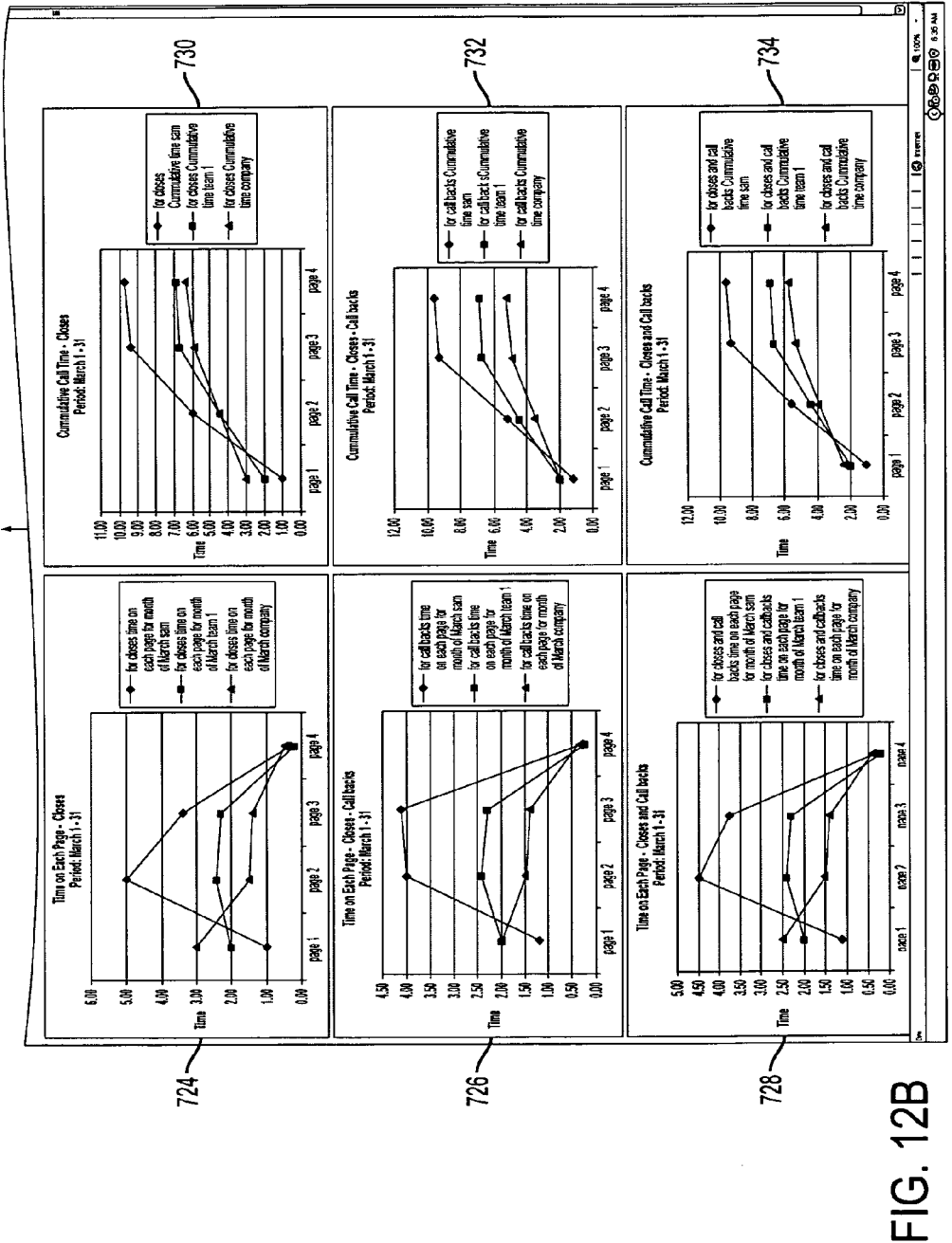

FIG. 12 is a view of an administrator's screen 700 displaying analytical information regarding agents. In the illustrated embodiment, a plurality of graphs is presented on the screen 700. The graphs may include a Drop in Customers at each Program Stage graph 720, a Page Conversion Rates graph 722, a Time on Each Page—Closes graph 724, a Time on Each Page—Call backs graph 726, a Time on Each Page—Closes and Call backs graph 728, a Cumulative Call Time—Closes graph 730, a Cumulative Call Time—Call Backs graph 732, a Cumulative Call Time—Closes and Call backs graph 734. As is to be appreciated, a wide variety of analytical information may be compiled and presented to the administrator. The graphs illustrated in FIG. 12 are merely representative of example analytics and are not intended to limit the scope of the present disclosure.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, user interface layouts, or screen displays described herein are necessarily intended to limit the scope of the invention.

It is to be understood that the figures and descriptions of the present invention have been simplified to illustrate elements that are relevant for a clear understanding of the present invention, while eliminating, for purposes of clarity, other elements. Those of ordinary skill in the art will recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention.

Moreover, the processes associated with the present embodiments may be executed by programmable equipment, such as computers, or other processor-based devices. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "host," "engine," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention. Any of the servers described herein, for example, may be replaced by a "server farm" or other grouping of networked servers (e.g., a group of server blades) that are located and configured for cooperative functions. It can be appreciated that a server farm may serve to distribute workload between/among individual components of the farm and may expedite computing processes by harnessing the collective and cooperative power of multiple servers. Such server farms may employ load-balancing software that accomplishes tasks such as, for example, tracking demand for processing power from different machines, prioritizing and scheduling tasks based on network demand, and/or providing backup contingency in the event of component failure or reduction in operability.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention. For example, no particular aspect or aspects of the examples of system architectures, table layouts, or report formats described herein are necessarily intended to limit the scope of the invention.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language or platform such as .NET, SQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high-level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, to transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN), metropolitan area network (MAN), wide area network (WAN), virtual private network (VPN), storage area network (SAN), or global area network (GAN), among other network varieties.

For example, a WAN computer network may cover a broad area by linking communications across metropolitan, regional, or national boundaries. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods and systems described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is in turn connected to a switch. The term "switch" can also include routers and bridges, as well as other devices that distribute data traffic by application content (e.g., a Web URL identifier). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

As employed herein, an application server may be a server that hosts an API to expose business logic and business processes for use by other applications. Examples of application servers include J2EE or Java EE 5 application servers including WebSphere Application Server. Other examples include WebSphere Application Server Community Edition (IBM), Sybase Enterprise Application Server (Sybase Inc), WebLogic Server (BEA), JBoss (Red Hat), JRun (Adobe Systems), Apache Geronimo (Apache Software Foundation), Oracle OC4J (Oracle Corporation), Sun Java System Application Server (Sun Microsystems), and SAP Netweaver AS (ABAP/Java). Also, application servers may be provided in accordance with the .NET framework, including the Windows Communication Foundation, .NET Remoting, ADO-.NET, and ASP.NET among several other components. For example, a Java Server Page (JSP) is a servlet that executes in a web container which is functionally equivalent to CGI scripts. JSPs can be used to create HTML pages by embedding references to the server logic within the page. The application servers may mainly serve web-based applications, while other servers can perform as session initiation protocol servers, for instance, or work with telephony networks. Specifications for enterprise application integration and service-oriented architecture can be designed to connect many different computer network elements. Such specifications include Business Application Programming Interface, Web Services Interoperability, and Java EE Connector Architecture.

In various embodiments, computers and computer systems described herein may have the following main components: arithmetic and logic unit (ALU), control unit, memory, and input and output devices (I/O devices). These components can be interconnected by busses, often comprising groups of wires or cables. The control unit, ALU, registers, and basic I/O (and often other hardware closely linked with these sections) can be collectively considered a central processing unit (CPU) for the computer system. The CPU may be constructed on a single integrated circuit or microprocessor.

The control unit (control system or central controller) directs the various components of a computer system. The control system decodes each instruction in a computer program and turns it into a series of control signals that operate other components of the computer system. To enhance performance or efficiency of operation, the control system may alter the order of instructions. One component of the control unit is the program counter, a memory register that tracks the location in memory from which the next instruction is to be read.

The ALU is capable of performing arithmetic and logic operations. The set of arithmetic operations that a particular ALU supports may be limited to adding and subtracting or might include multiplying or dividing, trigonometry functions (sine, cosine, etc.) and square roots. Some may be programmed to operate on whole numbers (integers), while others use floating point to represent real numbers, for example. An ALU may also compare numbers and return Boolean truth values (e.g., true or false). Superscalar computers may contain multiple ALUs to facilitate processing multiple instructions at the same time. For example, graphics processors and computers with SIMD and MIMD features often possess ALUs that can perform arithmetic operations on vectors and matrices. Certain computer systems may include one or more RAM cache memories configured to move more frequently needed data into the cache automatically.

Examples of peripherals that may be used in connection with certain embodiments of the invention include input/output devices such as keyboards, mice, screen displays, monitors, printers, hard disk drives, floppy disk drives, joysticks, and image scanners.

Embodiments of the methods and systems described herein may divide functions between separate CPUs, creating a multiprocessing configuration. For example, multiprocessor and multi-core (multiple CPUs on a single integrated circuit) computer systems with co-processing capabilities may be employed. Also, multitasking may be employed as a computer processing technique to handle simultaneous execution of multiple computer programs.

In various embodiments, the systems and methods described herein may be configured and/or programmed to include one or more of the above-described electronic, computer-based elements and components. In addition, these elements and components may be particularly configured to execute the various rules, algorithms, programs, processes, and method steps described herein.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A method for communication between a first party and a second party, wherein the first party has a computer device in a first location and the second party has a computer device in a second location, wherein the first party's computer device runs a browser application and the second party's computer device runs a browser application, the method comprising:
  telephonically connecting via a telephone system the first party and the second party;
  providing, by the first party's computer device to a processor-based computer server, a first indication of a first content to be displayed by the second party's browser application;
  providing, by the server to the second party's computer device, the first content to be displayed by the second party's browser application after the first indication has been provided to the server, wherein the server is in communication with the second party's computer device via a data network;
  providing, by the first party's computer device to the server, a second indication of a second content to be displayed by the second party's browser application after the first indication has been provided to the server;
  after expiration of a first timer associated with the second party's browser application, receiving a query at the server from the second party's computer device via the data network that queries whether the first content should continue to be displayed by the second party's browser application;
  in response to the query, providing, by the server to the second party's computer device, the second content to be displayed by the second party's browser application at least until the expiration of a second timer; and
  providing, by the server to the second party's computer device, a confirmation code to be displayed by the second party's browser application prior to displaying the first content.

2. The method of claim 1, wherein the first party is a call center agent, the second party is a customer, the first location is a call center, and the server is a call center server.

3. The method of claim 1, further comprising:
  providing, by the server to the first party's computer device, a script associated with the first content displayed on the second party's computer device after the first indication has been provided to the server.

4. The method of claim 1, wherein telephonically connecting the first party to the second party comprises a voice over internet (VoIP) telephonic.

5. The method of claim 1, wherein telephonically connecting the first party to the second party comprises a public switched telephone network (PSTN) connection.

6. The method of claim 1, wherein the first content is a webpage.

7. The method of claim 6, wherein the first indication comprises a selection of at least one webpage from a plurality of webpages to display on the second party's browser application.

8. The method of claim 1, further comprising:
  providing, by the server to the second party's computer device, a goal screen to be displayed by the second party's browser application after the second indication has been provided to the server; and
  providing, by the server to the first party's computer device, a goal status indicator to be displayed by the first party's computer device when the goal screen is displayed on the second party's browser application.

9. The method of claim 8, wherein the goal screen comprises a payment screen and the goal status indicator comprises a payment status indicator.

10. A system for communication between a first party and a second party, wherein the first party has a first computer device in a first location and the second party has a second computer device in a second location, wherein the first party's computer device runs a browser application and the second party's computer device runs a browser application, the system comprising:
  a computer database that stores data comprising a first content and a second content;
  a server in communication with the computer database that electronically communicates with the first computer device and the second computer device, wherein the server comprises at least one processor circuit and at least one memory circuit, wherein the server is programmed to:
    receive from the first computer device an indication of a first content to be displayed by a browser application run by the second computer device, wherein the first content comprises a webpage and wherein the first indication comprises a selection of at least one webpage from a plurality of webpages to display on the second party's browser application;
    provide to the second computer device the first content to be displayed by the browser application of the second computer device after the first indication has been received by the server;
    receive from the first computer device an indication of a second content to be displayed by the browser application of the second computer device after the first indication has been received by the server;
    after expiration of a first timer of the browser application of the second computer device, receive a query from the second computer device that queries whether the first content should continue to be displayed by the browser application of the second computer device; and
    in response to the query, provide to the second computer device the second content to be displayed by the browser application of the second computer device at least until the expiration of a second timer.

11. The system of claim 10, wherein the first computer device and the server are associated with a call center.

12. The system of claim 10, further comprising:
  a private branch exchange (PBX) that provides a telephonic connection between the first party and the second party.

13. A method, comprising:
  telephonically connecting via a telephony system an agent in a first location to a customer in a second location, wherein the agent is proximate to an agent's computer device and the customer is proximate to a customer's computer device, wherein the customer's computer device is in communication with a data network and runs a browser application, and wherein the agent's computer device is in communication with the data network and runs a browser application;
  providing, by the agent's computer device to a server, a first indication of a first webpage to be displayed by the customer's browser application;
  providing, by the server to the customer's computer device, the first webpage to be displayed by the customer's browser application after the first indication has been provided to the server;
  providing, by the agent's computer device to a server, a second indication of a second webpage to be displayed on the customer's browser application after the first indication has been provided to the server, wherein the second webpage is selected from a plurality of webpages stored in an electronic database;
  after expiration of a first timer associated with the customer's browser application, receiving a query at the server from the customer's computer device that queries whether the first webpage should continue to be displayed by the customer's browser application;

in response to the query, providing, by the server to the customer's computer device, the second webpage to be displayed by the customer's browser application at least until the expiration of a second timer;

providing, by the server to an administrator's computer device, a status indicator, wherein the status indicator comprises a status of the agent's computer device; and updating the status indicator when the status of the agent's computer device changes.

14. The method of claim 13, wherein the first location is a call center, the server is a call center server, and the data network comprises an Internet connection.

15. The method of claim 13, further comprising:
providing a menu to the agent's computer device for selecting content to be displayed on the customer's browser application.

16. A method for communication between a first party and a second party, wherein the first party has a computer device in a first location and the second party has a computer device in a second location, wherein the first party's computer device runs a browser application and the second party's computer device runs a browser application, the method comprising:

providing, by the first party's computer device to a processor-based computer server, a first indication of a first content to be displayed by the second party's browser application, wherein the first content comprises a webpage, and wherein the first indication comprises a selection of at least one webpage from a plurality of webpages to display on the second party's browser application;

providing, by the server to the second party's computer device, the first content to be displayed by the second party's browser application after the first indication has been provided to the server, wherein the server is in communication with the second party's computer device via a data network;

providing, by the first party's computer device to the server, a second indication of a second content to be displayed by the second party's browser application after the first indication has been provided to the server;

after expiration of a first timer associated with the second party's browser application, receiving a query at the server from the second party's computer device via the data network that queries whether the first content should continue to be displayed by the second party's browser application;

in response to the query, providing, by the server to the second party's computer device, the second content to be displayed by the second party's browser application at least until the expiration of a second timer.

17. A method for communication between a first party and a second party, wherein the first party has a computer device in a first location and the second party has a computer device in a second location, wherein the first party's computer device runs a browser application and the second party's computer device runs a browser application, the method comprising:

providing, by the first party's computer device to a processor-based computer server, a first indication of a first content to be displayed by the second party's browser application;

providing, by the server to the second party's computer device, the first content to be displayed by the second party's browser application after the first indication has been provided to the server, wherein the server is in communication with the second party's computer device via a data network;

providing, by the first party's computer device to the server, a second indication of a second content to be displayed by the second party's browser application after the first indication has been provided to the server;

after expiration of a first timer associated with the second party's browser application, receiving a query at the server from the second party's computer device via the data network that queries whether the first content should continue to be displayed by the second party's browser application;

in response to the query, providing, by the server to the second party's computer device, the second content to be displayed by the second party's browser application at least until the expiration of a second timer;

providing, by the server to the second party's computer device, a goal screen to be displayed by the second party's browser application after the second indication has been provided to the server; and providing, by the server to the first party's computer device, a goal status indicator to be displayed by the first party's computer device when the goal screen is displayed on the second party's browser application.

18. The method of claim 17, wherein the goal screen comprises a payment screen and the goal status indicator comprises a payment status indicator.

* * * * *